US012769446B1

(12) United States Patent
Ray et al.

(10) Patent No.: US 12,769,446 B1
(45) Date of Patent: Oct. 20, 2026

(54) MEMORY COMPACTION TO REDUCE EMULATION MODEL SIZE

(71) Applicant: Synopsys, Inc., Sunnyvale, CA (US)

(72) Inventors: Baijayanta Ray, Bengaluru (IN); Alexander Rabinovitch, Shrewsbury, MA (US)

(73) Assignee: Synopsys, Inc., Sunnyvale, CA (US)

( * ) Notice: Subject to any disclaimer, the term of this patent is extended or adjusted under 35 U.S.C. 154(b) by 33 days.

(21) Appl. No.: 18/886,914

(22) Filed: Sep. 16, 2024

(51) Int. Cl.
*G06F 3/06* (2006.01)

(52) U.S. Cl.
CPC .......... *G06F 3/0608* (2013.01); *G06F 3/0664* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 7,577,558 | B2 | 8/2009 | Birguer | |
| 2009/0292523 | A1 * | 11/2009 | Birguer | G06F 9/45537 711/E12.086 |
| 2019/0041530 | A1 * | 2/2019 | Veitsel | G01S 19/38 |
| 2021/0089305 | A1 * | 3/2021 | Lu | G06F 9/35 |

* cited by examiner

*Primary Examiner* — Kaushikkumar M Patel
(74) *Attorney, Agent, or Firm* — Weaver Austin Villeneuve & Sampson LLP

(57) ABSTRACT

A method of performing hardware emulation of a circuit design includes, in part, receiving data from a first memory of the circuit design. The first memory has a depth of D1 words each having a width of W1 bits. The method further include determining the number of segments N of each word of the first memory defined by operation floor (W1/W=N), wherein W is a width of a memory primitive disposed in the hardware emulation system. The method further includes storing the N segments of each word of the first memory in first N locations of the memory primitive, and storing the remainder R of each word of the first memory defined by (W1−NW=R) in the memory primitive.

13 Claims, 12 Drawing Sheets

MEMORY COMPACTION TO REDUCE EMULATION MODEL SIZE

TECHNICAL FIELD

The present application relates to hardware emulation systems, and more particularly to reducing the amount of physical memory used to store data from a memory of a design undergoing hardware emulation.

BACKGROUND

A hardware emulation system debugs and verifies the functionality of a circuit design by forming an emulation model of the circuit through programming of the programmable devices disposed in the hardware emulation system. The emulation model is representative of the digital circuit being designed and is often described in a hardware description language (e.g., Verilog) that is compiled into a format used by the emulation system.

A hardware emulation system includes a number of hardware and software components which together define the behavior of the emulation model (e.g., based on a hardware description language such as Verilog) and the digital circuit being verified and/or designed. One implementation of a hardware emulation system uses configurable hardware such as a field-programmable gate array (FPGA). An FPGA is an integrated circuit designed to be programmed by a designer/user after its manufacture and at the field. An FPGA contains an array of programmable logic blocks, memory blocks and a hierarchy of reconfigurable interconnects that enable the realization of the digital design under development.

In an emulation system, the user is interested in performing two basic actions, namely (i) to verify the digital design before tape-out, and (ii) obtain information about the digital design to determine if the digital design operates as intended and complies with the required specifications, such as power and speed. The complexity and gate count of current digital circuits has given rise to an increasing use of hardware emulation systems in verifying the functionality of the digital circuits.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

Figure

DETAILED DESCRIPTION

Aspects of the present disclosure relate to reducing the amount of physical memory of a hardware emulation system used to store data associated with one or more memories of a design being emulated.

When emulating a circuit design (hereinafter alternatively referred to as a design) using a hardware emulation system, the data associated with a memory of the design is stored in the hardware emulation system's memory primitives, such as a block random access memory (BRAM), or ultra RAM (URAM).

As the designs become more complex and integrate an ever increasing number of transistors on one or more dies, the emulation model size and hence the emulation capacity requirements also increase. Integrated circuits designed, for example, for artificial intelligence (AI) applications often include large caches with aspect ratios (i.e., depth/width) that do not readily conform to the aspect ratios of the available memory primitives of the hardware emulation system, thus causing the compiled models to consume a relatively large number of memory primitives with relatively low utilization. For example, in a typical hardware emulation system, a design memory which is 680 bits wide and 33 addresses deep may use up 10 BRAMs, which is not only inefficient and has low memory utilization, but can also lead to data congestion that cannot be easily mitigated.

Embodiments of the present disclosure overcome the above shortcoming by providing a multitude of compaction schemes that, among other advantages, reduce the amount of physical memory used during a hardware emulation of a design, and reduce the data traffic congestion.

In accordance with one aspect of the present disclosure, if the width $W_1$ of the data of the design memory (alternatively referred to herein as the width of the design memory) is larger than the width W of the memory primitive of the hardware emulation system in which the data is to be stored, then N segments of each word defined by floor ($W_1/W=N$), i.e., the quotient of the division operation, are stored in N locations of the memory primitive. The remaining bits of $W_1$ defined by ($W_1-NW=R$), referred to herein as the remainder, are stored in another location of the memory primitive.

Figure 1:
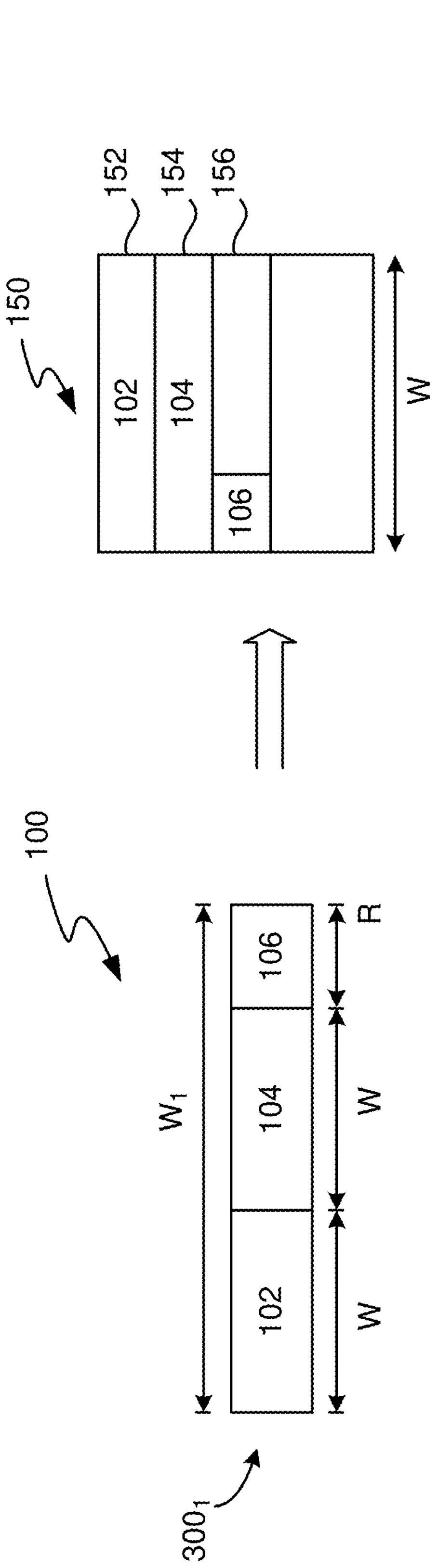
(FIG. 1 shows an example of a word of a design memory to be stored in a hardware emulation system's memory primitive, in accordance with one embodiment of the present disclosure.

FIG. 1 shows an example of a word 100 of a design memory having width $W_1$ that is be stored in a hardware emulation system's memory primitive having a memory width W. In the example shown in FIG. 1, $W_1$ is shown as being equal to 2 W+R. In other words, $W_1$ has a size defined by a sum of 2 W and R, where R is smaller than W. In accordance with a first aspect of the present disclosure, a first segment (i.e., series of bits) 102 of word 100 having width W is stored in a first location 152 of memory primitive 150; a second segment 104 of word 100 having width W is stored in a second location 154 of the memory primitive 150; and a third segment 106 of word 100 having width R is stored in a third location 156 of the memory primitive 150.

In accordance with another aspect of the present disclosure, if the width $W_1$ of the design memory is larger than the width W of the memory primitive of the hardware emulation system in which the data is to be stored, then N segments of each word defined by floor ($W_1/W=N$) are stored in N different locations of the memory primitive. Moreover, if the remainder R of each word is of a size such that K remainders from K different words are smaller than W, then the K remainders from the K different words are stored in the same location of the memory primitive. If the K remainders fit exactly within a location of the memory primitive (i.e., KR=W), then the memory compaction will be lossless as no physical memory space is left unused.

Figure 2:
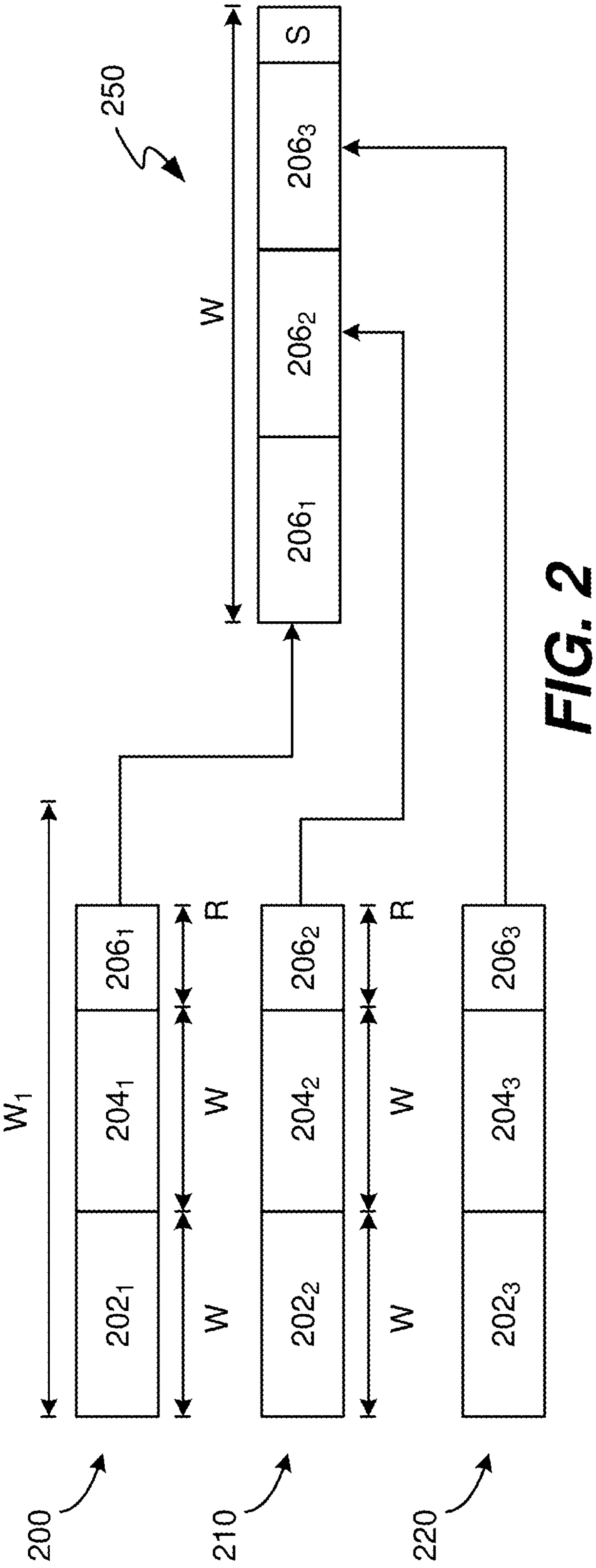
FIG. 2 shows an example of a multitude of words of a design memory to be stored in a hardware emulation system's memory primitive, in accordance with one embodiment of the present disclosure.

FIG. 2 shows an example of three words 200, 210 and 220 of a design memory each having width $W_1$ that are be stored in the hardware emulation system's memory primitive having a memory width W. The data width $W_1$ is shown as being equal to 2 W+R. For example, word 200 is shown as having a first segment $\mathbf{202}_1$ having width W, a second segment $\mathbf{204}_1$ having width W, and a third segment (i.e., reminder) $\mathbf{206}_1$ shown as having the width R. In a similar manner, word 210 is shown as having a first segment $\mathbf{202}_2$ having the width W, a second segment $\mathbf{204}_2$ having the width W, and a third segment $\mathbf{206}_2$ having the width R; and word 220 is shown as having a first segment $\mathbf{202}_3$ having the width W, a second segment $\mathbf{204}_3$ having the width W, and a third segment $\mathbf{206}_3$ having the width R.

Segments $\mathbf{202}_1$ and $\mathbf{204}_1$ of data 200 are written into first and second locations (not shown) of the memory primitive. Likewise, segments $\mathbf{202}_2$ and $\mathbf{204}_2$ of data 210 are written into third and fourth locations (not shown) of the memory primitive; and segments $\mathbf{202}_3$ and $\mathbf{204}_3$ of data 220 are written into fifth and sixth locations (not shown) of the memory primitive. If the width W is greater than 3R, in accordance with embodiments of the present disclosure, remainders $\mathbf{206}_1$, $\mathbf{206}_2$ and $\mathbf{206}_3$ are stored in a seventh location 250 of the memory primitive as shown in FIG. 2. If the remaining storage space S of location 250, as defined by (W−3R), is larger than R, then one or more remainders associated with other design memory data may also be stored in storage location 250.

In accordance with another aspect of the present disclosure, the lowest common multiplier (LCM) of the remainder R (from each word having width $W_1$) and W (the width of the memory primitive) is determined so as to store P remainders—each from a different word having width R—in (LCM/W) locations of the memory primitive. Accordingly, in such embodiments, the memory compaction is lossless.

Figure 3:
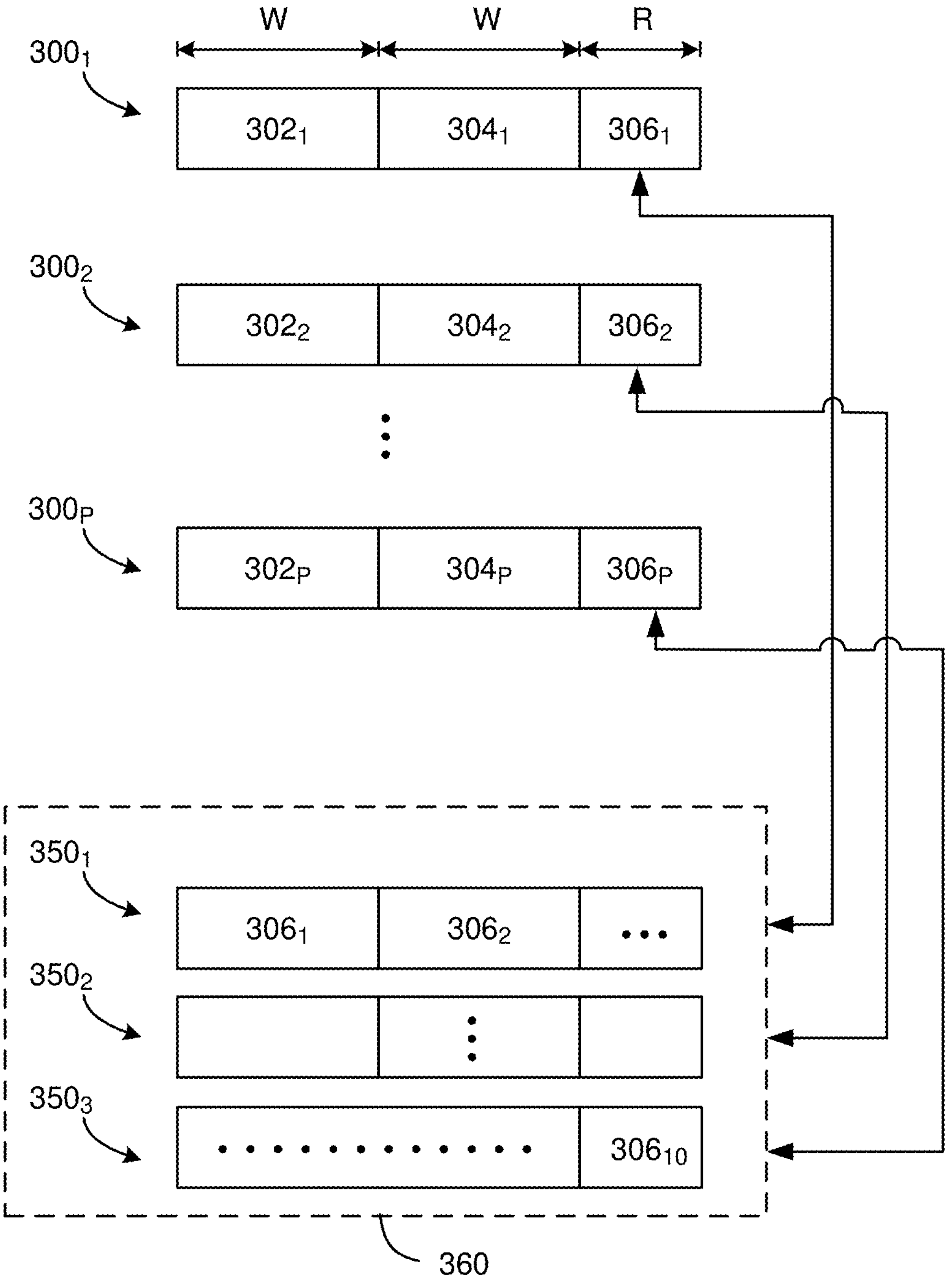
FIG. 3 shows another example of a multitude of words of a design memory to be stored in a hardware emulation system's memory primitive, in accordance with one embodiment of the present disclosure.

FIG. 3 shows P words of a design memory each having a width $W_1$, namely words $\mathbf{300}_1$, $\mathbf{300}_2$ . . . $\mathbf{300}_P$ that are to be stored in the hardware emulation system's memory primitive having a width W. The memory primitive is assumed to have a width W such that $W_1$=2 W+R, where R is the remainder as described above. For example, consider a design in which each design memory word has a width of 23 bits and the width of the memory primitive is 10 bits. Accordingly, 2 equal 10-bit segments of each word (e.g., segments $\mathbf{302}_1$ and $\mathbf{304}_1$ of memory word $\mathbf{300}_1$) may be stored in 2 different locations of the memory primitive.

In accordance with such aspects of the present disclosure, the LCM of numbers 10 (i.e., the width of the memory primitive) and 3 (the remainder of each memory word of the design) is determined; this LCM is 30. Accordingly, the remainders from 10 different design memory words are stored in exactly 3 different locations of the memory primitive. With respect to the example shown in FIG. 3, 10 remainders $\mathbf{306}_1$, $\mathbf{306}_2$ . . . $\mathbf{306}_{10}$ each having a width of 3 bits are stored in 10 different locations $\mathbf{350}_1$, $\mathbf{350}_2$ and $\mathbf{350}_3$ of memory primitive 360.

In accordance with another aspect of the present disclosure, if the design memory width $W_1$ is less than the width W of the memory primitive, but the depth of the design memory is more than the depth of the memory primitive such that the total storage space of the design memory is less than that of the memory primitive, then multiple words of the design memory may be stored in the same address of the memory primitive defined by floor ($W/W_1=N$) using a read-modify-write operation, as described further below.

In accordance with yet another aspect of the present disclosure, if the design memory width exceeds the storage capacity of a memory primitive, then each design memory word is split into two or more segments, each segment of which is stored in the memory primitive in accordance with any of the embodiments described above. Below are a few numerical examples of the memory compaction technique, in accordance with embodiments of the present disclosure.

Consider, as an example, two design memories each having a width of 101 bits and a depth (i.e., number of addresses) of 136. The storage capacity of the two memories is therefore 2×101×136=13,736 bits. A BRAM memory primitive has a storage capacity of 72×512=36,864 bits. Therefore, the contents of both design memories can be arranged to fit in a single BRAM. To achieve this, in accordance with embodiments of the present disclosure, the 101-bit wide data associated with each design memory is split into a first segment that is 72-bits wide (to fit the width of one BRAM memory primitive), and a second segment (remainder) that is 29-bits wide. The 72-bits wide segments are stored in different locations of the BRAM. The 29-bits wide segments associated with two different design words are stored in the same location of the BRAM, as described further below with reference to FIG. 4.

Figure 4:
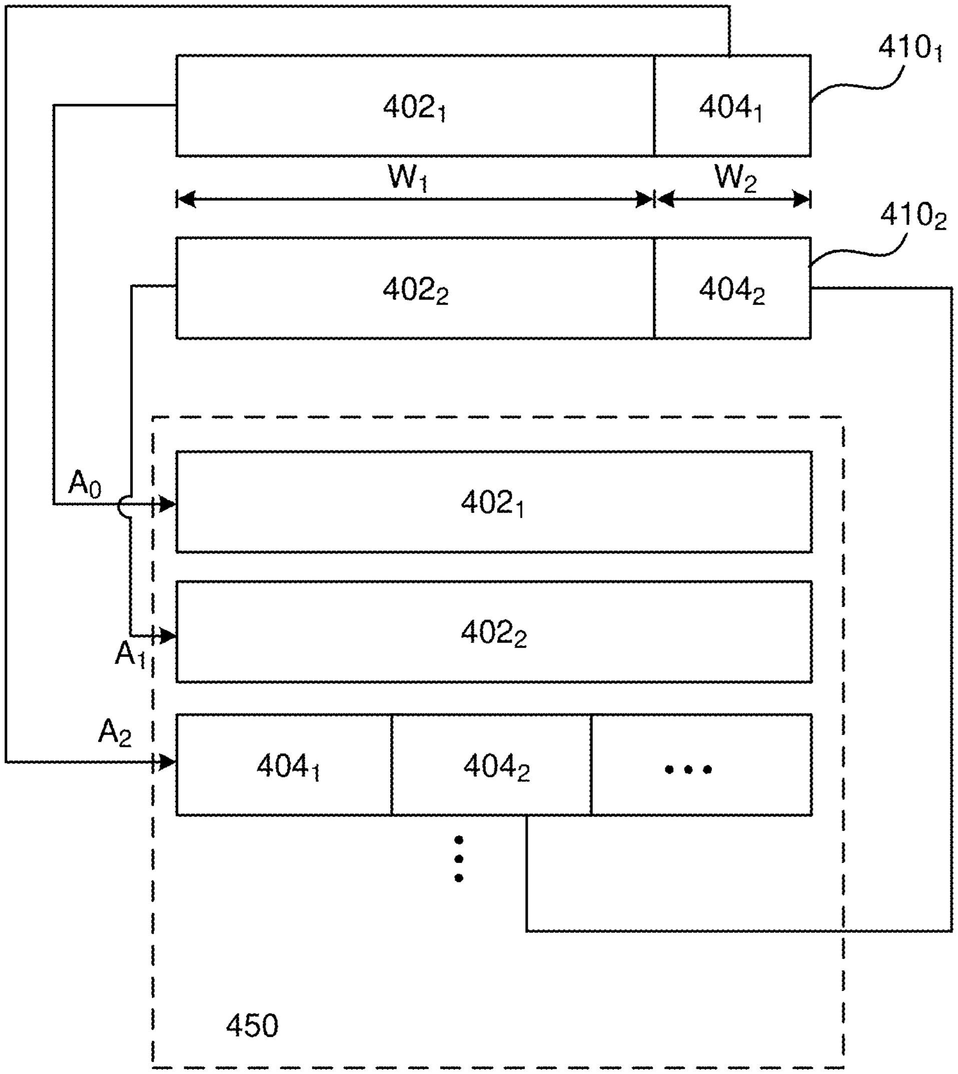
FIG. 4 shows another example of a multitude of words of a design memory to be stored in a hardware emulation system's memory primitive, in accordance with one embodiment of the present disclosure.

FIG. 4 shows design data $\mathbf{410}_1$ and $\mathbf{410}_2$ each of which is 101 bits wide. The design memory has a depth of 136. Data $\mathbf{410}_1$ is split into 2 segments, namely segment $\mathbf{402}_1$ that is 72-bits wide (shown as $W_1$), and segment $\mathbf{404}_1$ that is 29 bits (shown as $W_2$). Similarly, data $\mathbf{410}_2$ is split into 2 segments, namely segment $\mathbf{402}_2$ that is 72-bits wide, and segment $\mathbf{404}_2$ that is 29 bits wide. In accordance with embodiments of the present disclosure, segment 402$_1$ is stored in a first address $A_0$ of BRAM 450; segment 402$_2$ is stored in a second address $A_1$ of BRAM 450; and the two segments 404$_1$ and 404$_2$ are stored in a third address $A_2$ of BRAM 350. The 14 unused bits of address $A_2$ (72−2×29=14) may be padded with zeroes. In one embodiment, addresses $A_0$, $A_1$ and $A_2$ are consecutive addresses. Using the above memory compaction technique, the entire contents of the two design memories are stored in 408

$$\left(\text{i.e., } 2x\left(136+\frac{136}{2}\right)\right),$$

out of 512 addresses of BRAM 450.

In a typical system, the 72-bit segment of each design memory word is stored in one BRAM, and the 29-bit segment of each design memory word is stored in another BRAM. Therefore, because there are two design memories in this example, a typical system uses 4 BRAMS to store the data from such two design memories. Accordingly, embodiments of the present disclosure achieve 75% memory compaction in this example.

As another example, consider a design memory having a width of 123 bits and a depth of 264. To store the data from the design memory in a BRAM which has a storage capacity of 72×512 bits, each 123-bits data is split into a first segment that is 72-bits wide and a second segment that is 51-bits wide. The 72-bit segments of the design, of which there are 264, are stored in 264 addresses of the BRAM.

The remaining 51×264 bits of the design memory are stored in the remaining space (72×248 bits) of the BRAM. To achieve this, integers N1 and N2 are determined subject to the conditions N1<N2 and N1>N2/2, such that (264×N1) <=(248×N2) and floor ((N1×72)/(51×N2))=1. The above conditions are satisfied when N2=24 and N1=17 for the following reasons. The 264 words of width 51 may be divided into 11 groups each including 24 words of 51 bits. The total number of bits in each such group is thus 51×24. Each such group having 24 words may be divided into smaller groups of 17 words each being (51×72)/17 bits. Accordingly, the remaining 51×264 bits of data may be rearranged as 187 words (17 words in each of the 11 groups), each being 72 bits wide, and stored in 187 locations of the BRAM. In a typical system, the 264 72-bit segments of the design memory are stored in a first BRAM, and the 264 51-bit remainder segments of the design memory are stored in a second BRAM. Accordingly, embodiments of the present disclosure achieve 50% memory compaction in this example.

As another example, consider a design memory having a width of 680 bits and a depth of 52. The 680-bits of each word is divided into 9 segments of width 72 bits each, and one remainder segment of width 32 bits (9×72+32−680). Each of the 468 (i.e., 9×52) 72-bit segments is stored in one of the locations of a BRAM.

The remaining (32×52) bits of the design memory, corresponding to 52 remainders, each being 32-bits wide, are stored in the available space of 44 (512−468=44) addresses of the BRAM each of which is 72-bits wide. To achieve this, first the floor (72/32)=2 is computed. Since (52/floor(72/32))<=44, two remainder each of the length 32 bits may be stored in the same location of the BRAM. In other words, because the remainder from each design memory word is 32 bits, while the width of the BRAM is 72 bits, two remainders from two different design memory words may be stored in the same address of the BRAM. Accordingly, the remaining portions (32×52) bits of the design memory are also stored in the same BRAM. In a typical system, 10 BRAMS are used to store the design memory data for this example, such that one of each of 9 BRAMS is used to store one of the 9×72×52 bits of the design data; with the 10$^{th}$ BRAM storing 52×32 bits of the design data. Accordingly, embodiments of the present disclosure achieve 90% memory compaction in this example.

As another example, consider two design memories each having a width of 137 bits and a depth of 64. Each 137-bit word of each memory is divided into a first segment having 72 bits and a second segment having 65 bits. A first group of 64 locations of the BRAM are used to store the 64 72-bit segments of the first memory; a second group of 64 location of the BRAM are used to store the 64 65-bit segments of the first memory; a third group of 64 locations of the BRAM are used to store the 64 72-bit segments of the second memory; and a fourth group of 64 locations of the BRAM are used to store the 64 65-bit segments of the second memory. Therefore, in accordance with embodiments of the present disclosure, a single BRAM is used to store the contents of the two design memories. In a typical system, the 64 72-bit segments of the first memory are stored in a first BRAM, the 64 65-bit segments of the first memory are stored in a second BRAM, the 64 72-bit segments of the second memory are stored in a third BRAM, and the 64 65-bit segments of the second memory are stored in a fourth BRAM. Accordingly, using embodiments of the present disclosure, 75% memory compaction is achieved.

In some embodiments, the criteria used to determine which of two (or more) design memories' contents are to be compacted in the same memory primitive, such as a BRAM or URAM, is the difference between the design hierarchies associated with the two or more memories. For example, when applying this criteria, if a first memory is disposed in, e.g., design hierarchy level L (L is an integer), and the second memory is disposed in a design hierarchy level that is, for example, (L±M), where M is an integer less than e.g. 7, then the contents of the two memories may be included in the same memory primitive.

As another example, consider a design memory having a width of 88 bits and a depth of 2560. Each 88-bit word of the memory is divided into a first segment having 72 bits, and a second segment that is 16 bits. Each of the 2560 72-bit segments are stored in one of the addresses of a URAM which has a storage capacity of 4K×72 bits. Four 16-bit (88−72=16) segments from four different words are stored in the same address of the URAM. Accordingly, 640 addresses of the URAM are used to store the 16-bit segments of the data associated with the design memory. In a typical system, the 72-bits segments of each word are stored in a first URAM, and the 16-bit segments of each word are stored in a second URAM. Accordingly, using embodiments of the present disclosure, a 50% memory compaction is achieved.

As was described above, in accordance with some embodiments of the present disclosure, if the design memory width is less than the width of the memory primitive, but the depth of the design memory is more than that of the memory primitive such that the total storage space of the design memory is less than that of the memory primitive, then multiple words of the design memory are stored in the in the same address of the memory primitive.

As an example, consider a design memory having a width of 20 bits and a depth of 16K. Because the total size of the design memory is 320K bits, two URAMs each of which has 4K address each being 72-bits wide are used to store the design memory data. To store the design memory data in the URAMs, the 20-bit data from each group of 3 consecutive addresses of the design memory are written into the same address of a first URAM using a read-modify-write operation. In accordance with a read-modify-write operation, when the data is retrieved from a memory location, portions of the data that are not to be altered are masked, and portions of the retrieved data that are not masked are updated subsequent to which the unaltered as well as the updated portions of the data are written back to the same location. The remaining 20×4K bits of the design memory are stored in a second URAM. In a typical system, 4 URAMs are used to store the design data with each URAM storing 4K of the 20-bit data. Accordingly, embodiments of the present disclosure achieve 50% memory compaction in this example.

Figure 5:
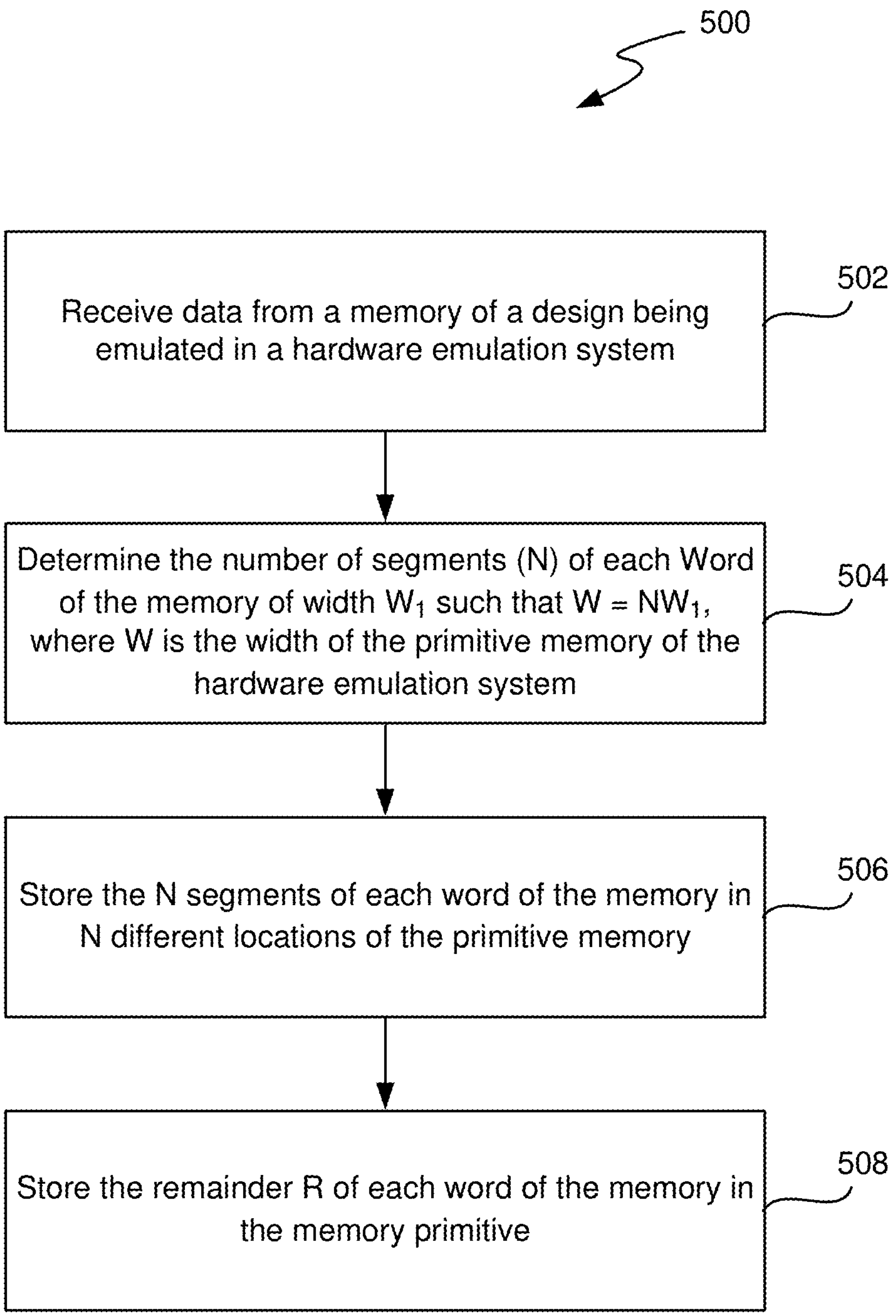
FIG. 5 is a flowchart for achieving memory compaction during hardware emulation of a circuit design, in accordance with one embodiment of the present disclosure.

FIG. 5 is a flowchart 500 for achieving memory compaction during hardware emulation of a circuit design, in accordance with one embodiment of the present disclosure. At 502, data is received from a design memory having a depth of D words each having a width of $W_1$ bits. At 504, the number of segments N of each word of the memory defined by operation floor ($W_1$/W=N) is determined, where W is the width of a memory primitive disposed in the hardware emulation. At 506, the N segments of each word are stored in N different locations of the primitive memory. At 508, the remainder R associated with the words of the memory, each defined by ($W_1$−NW=R) are stored in the primitive memory.

Figure 6:
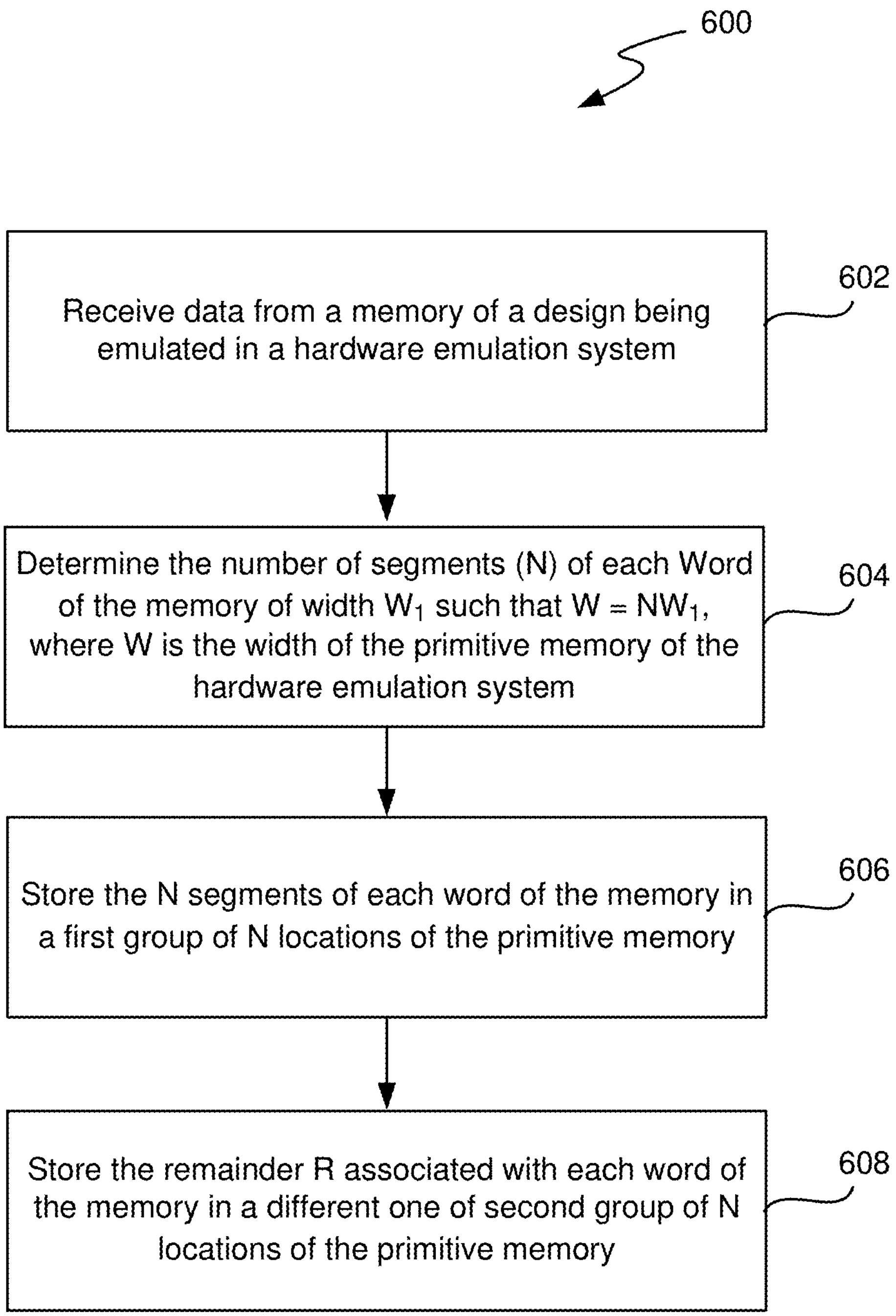
FIG. 6 is another flowchart for achieving memory compaction during hardware emulation of a circuit design, in accordance with one embodiment of the present disclosure.

FIG. 6 is a flowchart 600 for achieving memory compaction during hardware emulation of a circuit design, in accordance with one embodiment of the present disclosure. At 602, data is received from a design memory having a depth of D words each having a width of $W_1$ bits. At 604, the number of segments N of each word of the memory defined by operation floor ($W_1$/W=N) is determined, where W is the width of a memory primitive disposed in the hardware emulation. At 606, the N segments of each word are stored in a first group of N locations of the primitive memory. At 608, the remainder R associated with each word of the memory and defined by ($W_1$−NW=R) is stored in a different one of a second group of N locations of the memory primitive. For example, referring to FIG. 2, remainders 206$_1$, 206$_2$ and 206$_3$ are stored in a seventh location 250 of the memory primitive.

Figure 7:
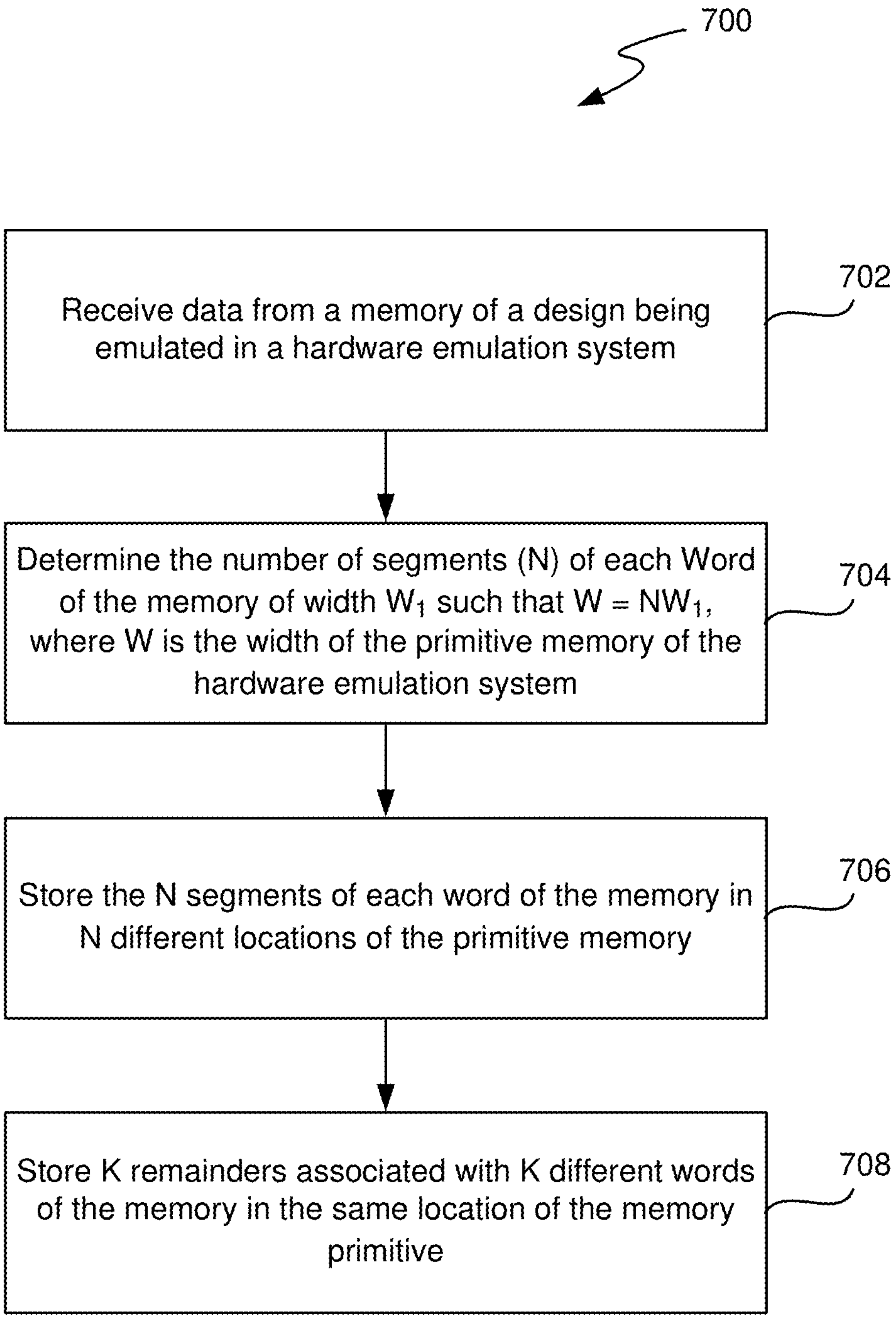
FIG. 7 is a flowchart for achieving memory compaction during hardware emulation of a circuit design, in accordance with one embodiment of the present disclosure.

FIG. 7 is a flowchart 700 for achieving memory compaction during hardware emulation of a circuit design, in accordance with one embodiment of the present disclosure. At 702, data is received from a design memory having a depth of D words each having a width of $W_1$ bits. At 704, the number of segments N of each word of the memory defined by operation floor ($W_1$/W=N) is determined, where W is the width of a memory primitive disposed in the hardware emulation. At 706, the N segments of each word are stored in N different locations of the primitive memory. At 708, K remainders R associated with K different words of the memory are stored in the same location of the memory primitive, where the remainder R associated with each word is defined by ($W_1$−NW=R). For example, referring to FIG. 4, two segments 404$_1$ and 404$_2$ with remainders are stored in a third address $A_2$ of BRAM 350.

Figure 8:
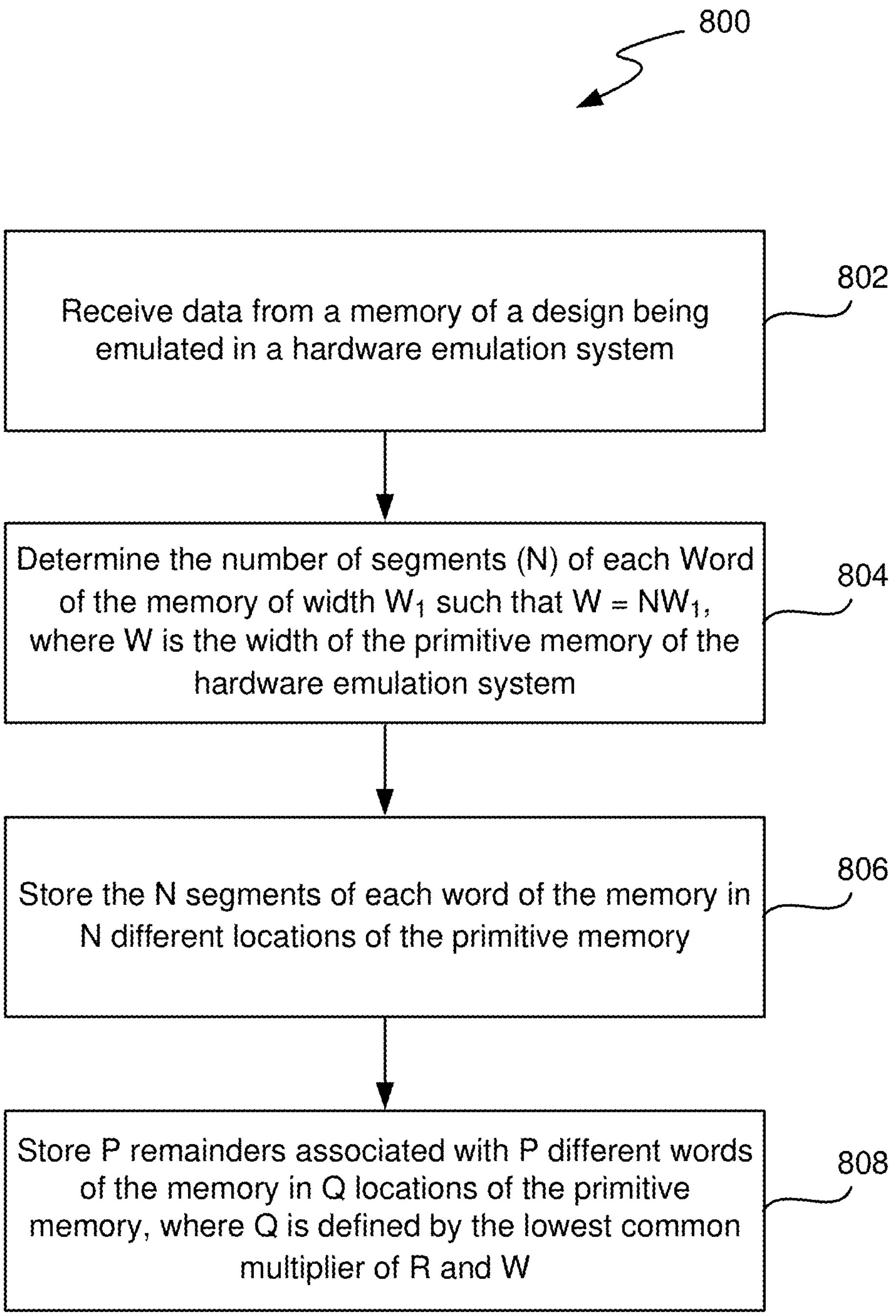
FIG. 8 is another flowchart for achieving memory compaction during hardware emulation of a circuit design, in accordance with one embodiment of the present disclosure.

FIG. 8 is a flowchart 800 for achieving memory compaction during hardware emulation of a circuit design, in accordance with one embodiment of the present disclosure. At 802, data is received from a design memory having a depth of D words each having a width of $W_1$ bits. At 804, the number of segments N of each word of the memory defined by operation floor ($W_1$/W=N) is determined, where W is the width of a memory primitive disposed in the hardware emulation. At 806, the N segments of each word are stored in N different locations of the primitive memory. At 808, P remainders R associated with P different words of the memory are stored in Q locations of the memory primitive locations, where Q is defined the lowest common multiplier of R and W, and where the remainder R associated with each word is defined by ($W_1$−NW=R). For example, referring to FIG. 3, 10 remainders 306$_1$, 306$_2$ . . . 306$_{10}$ each having a width of 3 bits are stored in 10 different locations 350$_1$, 350$_2$ and 350$_3$ of memory primitive 360.

Figure 9:
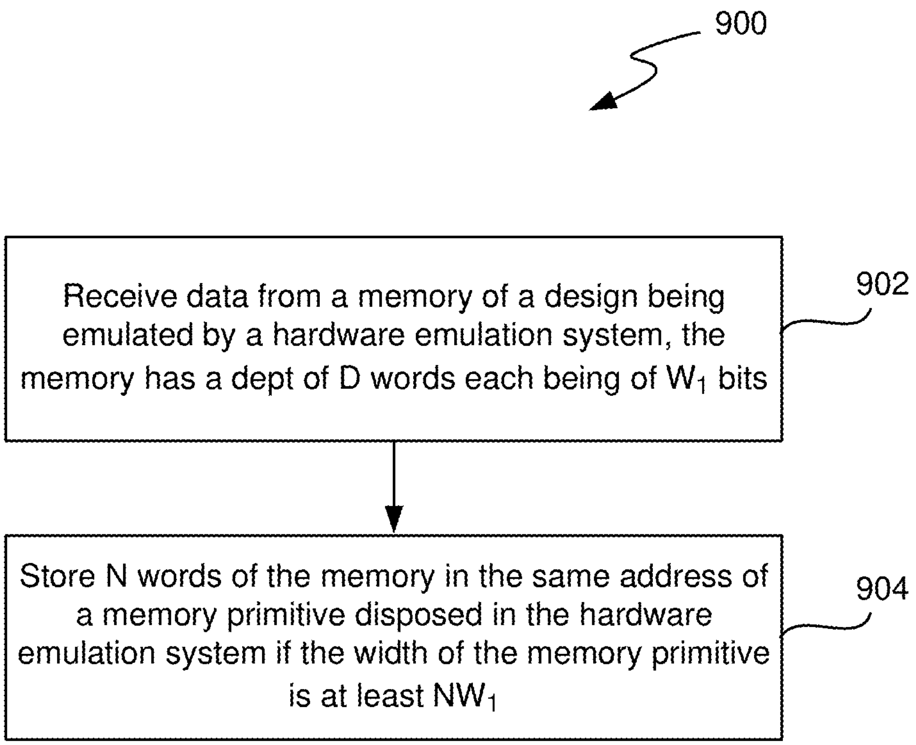
FIG. 9 is another flowchart for achieving memory compaction during hardware emulation of a circuit design, in accordance with one embodiment of the present disclosure.

FIG. 9 is a flowchart 900 for achieving memory compaction during hardware emulation of a circuit design, in accordance with one embodiment of the present disclosure. At 902, data is received from a design memory having a depth of D words each having a width of $W_1$ bits. At 904, each of N words of the memory are stored in a first address of a memory primitive disposed in the hardware emulation in response to a determination that a width W of the memory primitive is at least $NW_1$, wherein N is an integer equal to or greater than 2. The storage capacity of the memory primitive may be greater than or equal to $DW_1$.

During hardware emulation of a design, the maximum number of ports of a memory disposed in the design that are accessed to perform write/read operations (i.e., alternatively referred to herein as active ports) is often smaller than the total number of ports of the memory used in the emulation system. For example, consider a 16-port memory disposed in a design and used to perform memory write (or read) operations. A bit enable (En) signal may be used to identify each port that may be accessed to perform the write (or read) operations. A bit value of logic 1 for an enable signal En may be used to indicate that the associated port of the memory is to be accessed for either write or read operations, i.e., the port will be an active port. Similarly, a bit value of logic 0 may be used to indicate that the associated port is not an active port. A logic 1 may represent an asserted state of the enable bit signal, and a logic value of 0 may represent an unasserted state of the enable bit signal. For example, the 16-element bit enable vector En(1 0 1 0 1 0 0 0 0 0 0 0 0 0 0 1) indicates that port no. 1 defined by En(1), port no. 3 defined by En(3), port no. 5 defined by En(5), and port no. 16 defined by En(16) are the only ports that will be active during a succeeding emulation cycle. Therefore, in this example, only 4 of the 16 ports, namely ports 1, 3, 5, 16 will be active ports due to the asserted states of their corresponding bit enable signals. It is appreciated that the a bit value of logic 0 for En may be used to indicate an active port, and a bit value of logic 1 for En to indicate an inactive port, without deviating from the scope of the present disclosure.

As the above example shows, the maximum number of active ports (M) of a memory during an emulation cycle is often smaller than the total number of ports (N) of the memory. In one embodiment, the maximum number of active memory ports may be determined by the emulation compiler at runtime. In another embodiment, the maximum number of active ports of a memory may be specified by a designer/user of the circuit design.

Accordingly, to achieve further memory compaction when the design memory width is greater than the width of the memory primitive, enable signal(s) associated with the port(s) of the design memory may be used to reduce the number of write operations. Consider, for example, a design memory having a width of 680 bits whose data is to be stored in a memory primitive having a width of 72 bits. To write a word of the design memory in the memory primitive would require 10 write cycles. However, if it is determined, for example, based on the enable signals defining the number of the active memory ports, that only 432 bits (6×72) of each design memory word are to be stored in the memory primitive, then only 6 write cycles would be required to complete the write operation. In other words, for this example, the number of write cycles is reduced from 10 to 6. Moreover, during cycles when a port is not active, regardless of whether during such cycles an enable bit is present for the port, no write operation is performed for such a port, as described further below.

In accordance with embodiments of the present disclosure, an array of N write/read enable signals corresponding to N ports of a memory is used to identify the active ports of the memory that will be subsequently accessed to carry out the write/read operations. Accordingly, given an unsorted binary array of size N of logic 1s and 0s associated with the enable signals, and assuming the number of 1s in the binary array does not exceed M, in one aspect, embodiments of the present disclosure return the position of 1s corresponding to the maximum number of active ports M.

Consider the 16-element array of enable signals En(1:16) of 0s and 1s described above. The array may be transformed to a corresponding array F(1:16), such that F(k)=j, j<=k, if there are j logic 1's between 0 and k. In one embodiment, the transformed array F may be computed as an array of prefix sums of the enable signal bits. For the above example of the enable bits vector En(1 0 1 0 1 0 0 0 0 0 0 0 0 0 0 1), the 16-element array of prefix sums of the enable bits (PrefixSum(En)) is computed as shown below:

$$PS(1) = PrefixSum(En(1)) = 1$$

$$PS(2) = PrefixSum(En(1) + En(2)) = 1$$

$$PS(3) = PrefixSum(En(1) + En(2) + En(3)) = 2$$

$$PS(4) = PrefixSum(En(1) + En(2) + En(3) + En(4)) = 2$$

$$PS(5) = PrefixSum(En(1) + En(2) + En(3) + En(4) + En(5)) = 3$$

$$PS(6) = PrefixSum(En(1) + En(2) + En(3) + En(4) + En(5) + En(6)) = 3$$

.

.

$$PS(16) = PrefixSum(En(1) + En(2) + En(3) + En(4) + En(5) + En(6) + En(7) \ldots + En(16)) = 4$$

The 16-element array of prefix sums PS(1) . . . . PS(16) are computed in parallel using any one of the known parallel prefix sum circuits formed using combinational logic gates. It is understood that embodiments of the present disclosure are not limited to using prefix sums, and that any other technique that computes an array of numbers from the enable bits arranged in an ascending/descending order falls within the scope of the embodiments of the present disclosure.

As described above, given an N-element array of enable bits, i.e., En(1:N), the array PS(1:N) is determined using, for example, the prefix sums shown above. Since PS(N) is smaller than or equal to M (M is 4, N is 16, and PS(16)=4 in this example), for parameter P ranging from 1 to PS(N), embodiments of the present disclosure identify the leftmost bit position in PS(1:N) (also referred to herein as PrefixSum (1:N)) for which the array element is P. The identification of the leftmost bit position is carried out advantageously for all Ps in parallel using a binary search and via M parallel processing elements. In one embodiment, such a binary search may be carried out using a combinational logic that has a depth of $\log_2(N)$ stages. Any one of a number of binary search techniques may be used. The bit positions identified as described above are the ports that will be accessed to perform the memory write/read operations during a succeeding emulation cycle.

For the 16-element enable signals vector En(1 0 1 0 1 0 0 0 0 0 0 0 0 0 0 1) described above, the binary search identifies: (i) the smallest index (i.e., the leftmost bit position) associated with PS=1 as being En(1) corresponding to port no. 1, (ii) the smallest index associated with PS=2 as being En(3) corresponding to port no. 3, (iii) the smallest index associated with PS=3 as being En(5) corresponding to port no. 5, (iv) and the smallest index associated with PS=4 as being En(16) corresponding to port no. 16. Therefore, for the example above, the only memory ports that will be accessed to perform memory write or read operations are port numbers 1, 3, 5 and 16.

The data associated with each active port number identified as described above, together with the data that is to be written to that port number (assuming a write operation) are stored in different locations of a temporary storage space (e.g., flip-flops) during the same emulation cycle T in which prefix sums are computed and binary searches are performed. Thereafter, during the succeeding emulation cycle (T+1), the data stored in the temporary storage space are retrieved in order to write at each retrieved port number of the memory, the retrieved data associated with that port number. For a memory read operation, the active port numbers identified in emulation cycle T are stored in different locations of the temporary storage space. Thereafter, during the succeeding emulation cycle (T+1), the data stored in the temporary storage space are retrieved to perform a read operation for each retrieved port number.

Figure 10A:
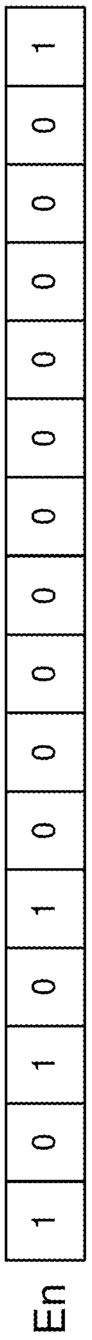
FIG. 10A shows an example of an array of enable signal bits, in accordance with one embodiment of the present disclosure.
Figure 10B:
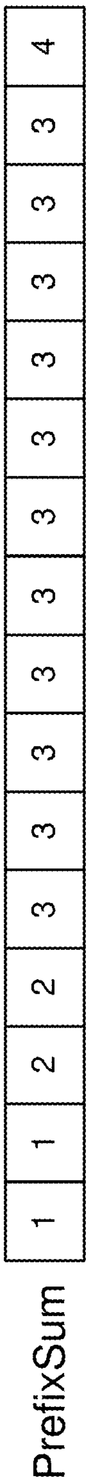
FIG. 10B shows an array of prefix sums computed from the array of enable signal bits of FIG. 10A, in accordance with one embodiment of the present disclosure.
Figure 10C:
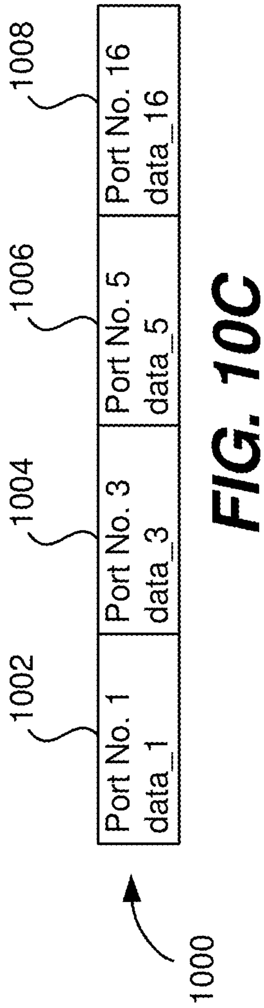
FIG. 10C shows active ports of a memory identified from the array of prefix sums shown in FIG. 10B, in accordance with one embodiment of the present disclosure.

FIG. 10A shows the 16-element array of enable signal bits En(1 0 1 0 1 0 0 0 0 0 0 0 0 0 0 1) described above. FIG. 10B shows the 16-element array PrefixSum computed from the array of enable bits of FIG. 10A, as described above. FIG. 10C shows that active ports 1, 3, 5 and 16 identified from the PrefixSum array of FIG. 10B using a binary search, together with their respective data data_1, data_3, data_5 and data_16 are stored in storage locations 1002, 1004, 1006 and 1008 of storage space 1000, respectively. The computation of the PrefixSum array, the identification of the active port numbers, and the storage of the active port numbers and their corresponding data occur during the same emulation cycle T. During the next emulation cycle T+1, the data stored in storage locations 1002, 1004, 1006 and 1008 are retrieved and stored in the memory (not shown) using their respective port numbers.

As described above, in one embodiment, the compiler determines at runtime that no more than M ports of an N-port memory are active at any given emulation cycle. In other embodiments, the designer/user of the design specifies the maximum number of ports that may be active during the emulation cycles. Either of the above techniques may be used to set the maximum number of ports (i.e., M) that may be active during any given emulation cycle. If, however, during a given emulation cycle, the maximum number of active ports exceeds M, in accordance with another aspect of the present disclosure, the emulation clock is stopped and all the N ports of the memory are accessed to perform the associated write/read operations, subsequent to which the emulation clock resumes.

In some embodiment, the compiler can determine the number of active ports within two or more subsets of the N ports of the memory, thereby simplifying the binary search of the active ports. Consider a memory with N ports, for which only U number of ports 1 through S are active during any given cycle, and only V number of the remaining ports (S+1) through N are active during any given cycle, where U and V are integers. Ports 1 through S form the first subset of the N ports, and ports (S+1) through N form the second subset of the N ports. Accordingly, subsets 1 and 2 are non-overlapping subsets. Moreover, subsets 1 and 2 are mutually exclusive subsets such that if one or more ports in the first subset is active during a cycle, no other port from the second subset is active during that cycle, and vice versa. Mutual exclusivity may be determined by analyzing the input logic cone of the port enable and clock and establishing that the active edges of the clocks associated with two mutually exclusive ports cannot occur simultaneously and/or the enable of two such ports cannot be simultaneously active.

For example, consider a memory with 6 ports, namely port nos. 1, 2, 3, 4, 5, and 6. It may be determined statically that, for example, only one of the port nos. 1, 2, 3 (i.e., U is 1 and S is 3 in this example) may be active during any given cycle, and only one of the port nos. 4, 5, 6 (i.e., V is 1 in this example) may be active during another given cycle. In such embodiments, a first prefix sum array corresponding to ports 1, 2 and 3 is computed as described above. Similarly, a second prefix sum array corresponding to ports 4, 5 and 6 is computed. Thereafter, a first search is performed within the first prefix sum array to identify the bit positions corresponding to the active port(s) in the first subset of the N ports. Similarly, a second search is performed, in parallel with the first search, within the second prefix sum array to identify the bit positions corresponding to the active port(s) in the second subset of the N ports. Because each of the first and second searches is conducted on a smaller set of numbers, the search process is simplified. In another embodiment, the first and second searches may be performed in sequence.

A method of performing hardware emulation of a circuit design, in accordance with one embodiment of the present disclosure includes, in part, receiving data from a first memory of the circuit design, wherein the first memory has a depth of D1 words each having a width of W1 bits; determining a number of segments N of each word of the first memory defined by operation floor (W1/W=N), wherein W is a width of a memory primitive disposed in a hardware emulation system; storing the N segments of each word of the first memory in first N locations of the memory primitive; and storing the remainder R of each word of the first memory defined by (W1−NW=R) in the memory primitive.

In one embodiment, the method further includes, in part, storing the remainder R of each word of the first memory in a different one of second N locations of the memory primitive. In one embodiment, the method further includes, in part, storing K remainders associated with K different words of the first memory in the same location of the memory primitive in response to KR being smaller than or equal to W. In one embodiment, the method further includes, in part, storing P remainders associated with P different words of the first memory in Q locations of the memory primitive, wherein Q is defined by a lowest common multiplier of the R and the W.

In one embodiment, the method further includes, in part, storing data from a second memory of the circuit design in the memory primitive. In one embodiment, the method further includes, in part, storing the data from the second memory of the circuit design in the memory primitive if a difference between hierarchical design levels of the first and second memories in the circuit design meets a criteria.

In one embodiment, the method further includes, in part, identifying a number of ports from among M ports of the first memory that are to be accessed for write operations during a plurality of hardware emulation cycles; receiving an M-element array of enable signal bits (En), each element of the array of enable signal bits being associated with a different one of the M ports of the first memory; computing an M-element array of numerical values from the M-element array of enable signal bits, wherein the array of numerical values is arranged in an order; responsive to a determination that a largest of the M numerical values is smaller than or equal to the number of ports, identifying, from the array of numerical values, positions of elements in the M-element array of enable signal bits that are in an asserted state; and accessing one or more ports of the first memory, corresponding to the identified positions of elements in the M-element array of enable signal bits, to perform a write operation.

In one embodiment, the M-element array of numerical values is an M-element array of prefix sums (PrefixSum) associated with the M-element array of enable signal bits, wherein the PrefixSum(k)=En(1)+En(2) . . . +En(j), wherein j is an integer variable varying from 1 to M. In such embodiments, the identifying of the positions of the elements in the M-element array of enable signal bits that are in an asserted state further includes, in part, identifying, for each integer parameter U ranging from 1 to M, a leftmost bit position in the PrefixSum array for which an element in the PrefixSum array is U.

In one embodiment, the storage capacity of the memory primitive is greater than or equal to DW1. In one embodiment, the memory primitive has a depth of D2 that is greater than D1. In such embodiments, the method further includes, in part, determining integers N1 and N2 subject to conditions (i) N1<N2, and (ii) N1>(N2/2), such that (D1×N1)<=(D2−D1)×N2; and storing the (D2−N) remainders in V×N1addresses of the memory primitive such that V×N1×W=V×N2×(W1−W).

A non-transitory computer readable medium, in accordance with one embodiment of the present disclosure, include stored instructions which when executed by a processor, cause the processor to receive data from a first memory of the circuit design, wherein the first memory has a depth of D words each having a width of W1 bits; and store each of N words of the first memory in a first address of a memory primitive disposed in the hardware emulation system in response to a determination that a width W of a memory primitive is at least NW1, wherein N is an integer equal to or greater than 2, and wherein a storage capacity of the memory primitive is greater than or equal to DW1.

In one embodiment, the instructions further cause the processor to update a first one of the N words stored in the first address of the memory primitive using a read-modify-write operation. In one embodiment, the instructions further cause the processor to store each of the N words of the first memory in the first address of the memory primitive in a single read-modify-write operation, in response to a determination that each of N ports corresponds to the N words of the first memory are mapped to the first address of the memory primitive.

A hardware emulation system, in accordance with one embodiment of the present disclosure includes, in part, a memory storing instructions; and a processor, coupled with the memory and configured to execute the instructions which when executed cause the processor to emulate a circuit design. The instructions further cause the processor to receive data from a first memory of the circuit design, wherein the first memory has a depth of D words each having a width of W1 bits; determine a number of segments N of each word of the first memory defined by operation floor (W1/W=N), wherein W is a width of a memory primitive disposed in the hardware emulation; store the N segments of each word of the first memory in first N locations of the memory primitive; and store a remainder R of each word of the first memory defined by (W1−NW=R) in the memory primitive.

In one embodiment, the instructions further cause the processor to store the remainder R of each word of the first memory in a different one of second N locations of the memory primitive. In one embodiment, the instructions further cause the processor to store K remainders associated with K different words of the first memory in a same location of the memory primitive in response to KR being smaller than or equal to W. In one embodiment, the instructions further cause the processor to store P remainders associated P different words of the first memory in Q locations of the memory primitive, wherein Q is defined by a lowest common multiplier of the R and the W.

In one embodiment, the instructions further cause the processor to store data from a second memory of the circuit design in the memory primitive. In one embodiment, the instructions further cause the processor to store the data from the second memory of the circuit design in the memory primitive if a difference between hierarchical design levels of the first and second memories in the circuit design meets a criteria.

In one embodiment, the instructions further cause the processor to identify a number of ports from among M ports of the first memory that are to be accessed for write operations during a plurality of hardware emulation cycles; receive an M-element array of enable signal bits (En), each element of the array of enable signal bits being associated with a different one of the M ports of the first memory; compute an M-element array of numerical values from the M-element array of enable signal bits, wherein the array of numerical values is arranged in an order; responsive to a determination that a largest of the M numerical values is smaller than or equal to the number of ports, identify, from the array of numerical values, positions of elements in the M-element array of enable signal bits that are in an asserted state; and access one or more ports of the memory, corresponding to the identified positions of elements in the M-element array of enable signal bits, to perform a write operation.

Figure 11:
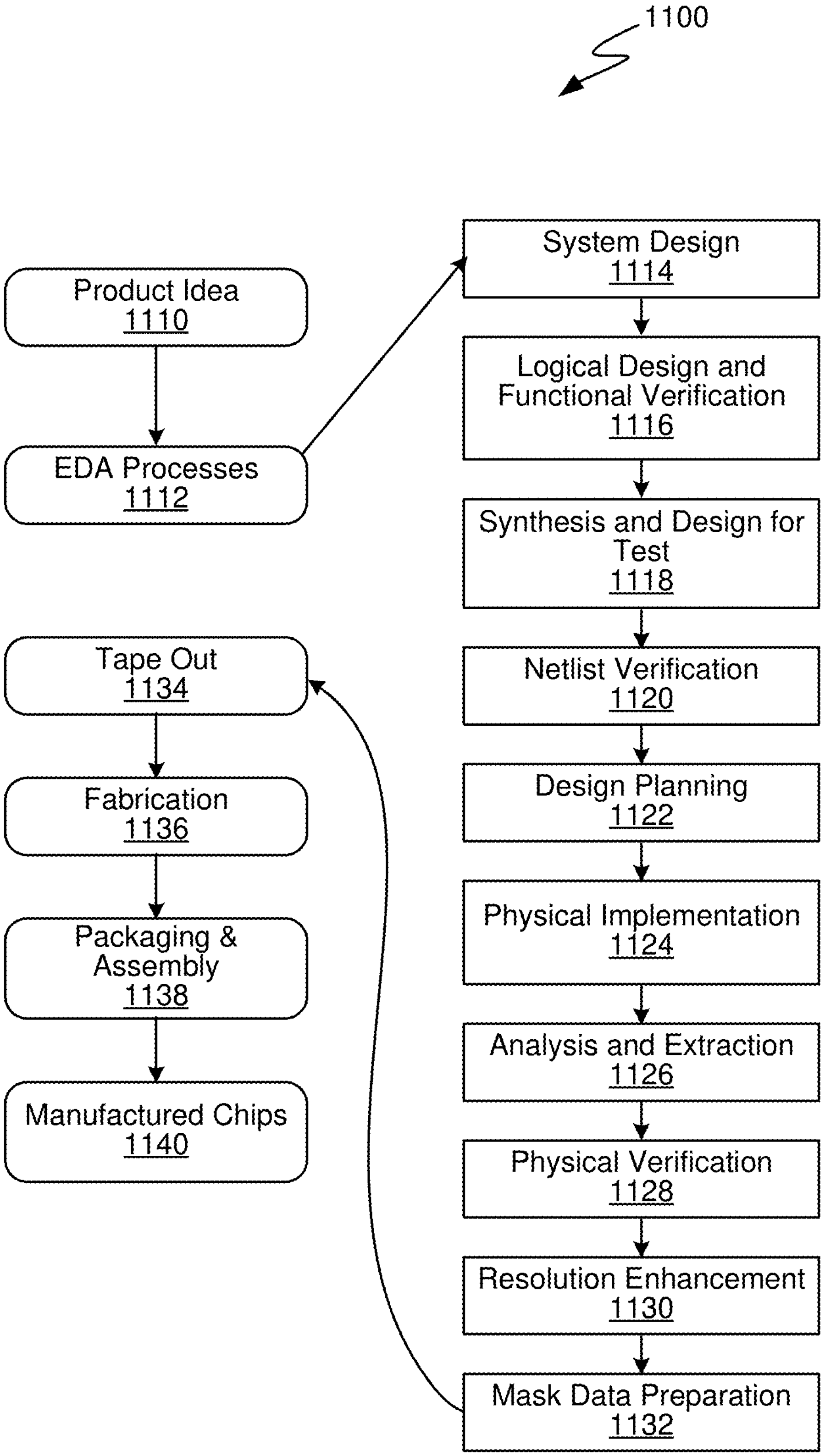
FIG. 11 depicts a flowchart of various processes used during the design and manufacture of an integrated circuit in accordance with some embodiments of the present disclosure.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1136 are performed to produce the finished integrated circuit 1140.

Specifications for a circuit or electronic structure may range from low-level transistor material layouts to high-level description languages. A high-level description may be used to design circuits and systems, using a hardware description language ('HDL') such as VHDL, Verilog, System Verilog, SystemC, MyHDL or Open Vera. The HDL description can be transformed to a logic-level register transfer level ('RTL') description, a gate-level description, a layout-level description, or a mask-level description. Each lower level description adds more useful detail into the design description, for example, more details for the modules that include the description. The lower levels of description can be generated by a computer, derived from a design library, or created by another design automation process. An example of a specification language at a lower level language for specifying more detailed descriptions is SPICE, which is used for detailed descriptions of circuits with many analog components. Descriptions at each level is enabled for use by the corresponding tools of that layer (e.g., a formal verification tool). A design process may use a sequence depicted in FIG. 11. The processes described by be enabled by EDA products (or tools).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system (such as computer system 1100 of FIG. 7) may be used to store the programs and data structures that are used by some or all of the EDA products described herein, and products used for development of cells for the library and for physical and logical design that use the library.

Figure 12:
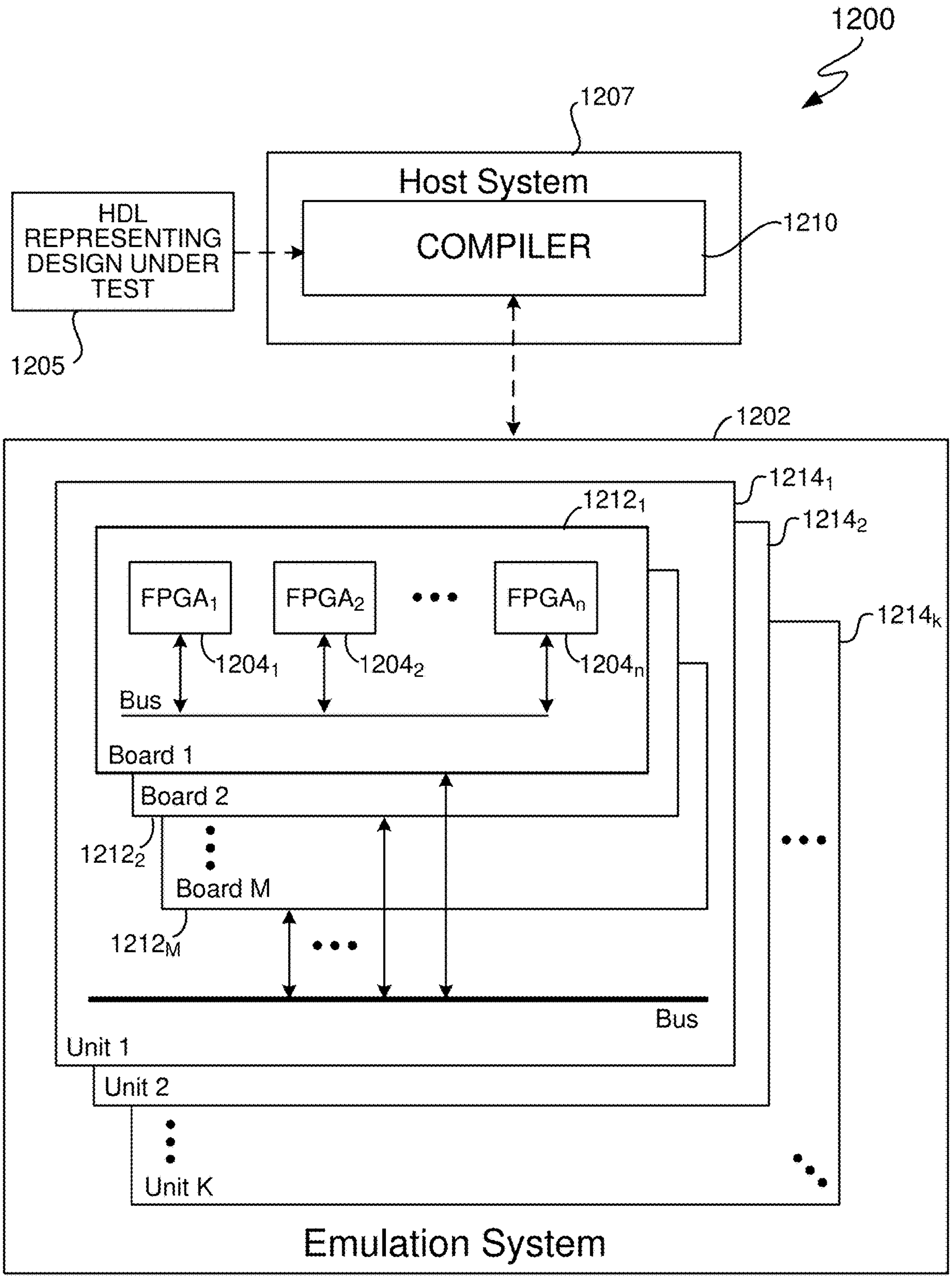
FIG. 12 depicts a diagram of an example emulation system in accordance with some embodiments of the present disclosure.

FIG. 12 depicts a diagram of an example hardware emulation environment 1200. An emulation environment 1200 may be configured to verify the functionality of the circuit design. The emulation environment 1200 may include a host system 1207 (e.g., a computer that is part of an EDA system) and an emulation system 1202 (e.g., a set of programmable devices such as Field Programmable Gate Arrays (FPGAs) or processors). The host system generates data and information by using a compiler 1210 that transforms each of a multitude of flip-flop to a dual-enable flip-flop, as described above, to structure the emulation system to emulate a circuit design. A circuit design to be emulated is also referred to as a Design Under Test ('DUT') where data and information from the emulation are used to verify the functionality of the DUT.

The host system 1207 may include one or more processors. In the embodiment where the host system includes multiple processors, the functions described herein as being performed by the host system can be distributed among the multiple processors. The host system 1207 may include a compiler 1210 to transform specifications written in a description language that represents a DUT and to produce data (e.g., binary data) and information that is used to structure the emulation system 1202 to emulate the DUT. The compiler 1210 can transform, change, restructure, add new functions to, and/or control the timing of the DUT.

The host system 1207 and emulation system 1202 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 1207 and emulation system 1202 can exchange data and information through a third device such as a network server.

The emulation system 1202 includes multiple FPGAs (or other modules) such as FPGAs $\mathbf{1204}_1$ and $\mathbf{1204}_2$ as well as additional FPGAs to $\mathbf{1204}_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 1202 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $\mathbf{1204}_1$-$\mathbf{1204}_N$ may be placed onto one or more boards $\mathbf{1212}_1$ and $\mathbf{1212}_2$ as well as additional boards through $\mathbf{1212}_M$. Multiple boards can be placed into an emulation unit $\mathbf{1214}_1$. The boards within an emulation unit can be connected using the backplane of the emulation unit or any other types of connections. In addition, multiple emulation units (e.g., $\mathbf{1214}_1$ and $\mathbf{1214}_2$ through $\mathbf{1214}_K$) can be connected to each other by cables or any other means to form a multi-emulation unit system.

For a DUT that is to be emulated, the host system 1207 transmits one or more bit files to the emulation system 1202. The bit files may specify a description of the DUT and may further specify partitions of the DUT created by the host system 1207 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 1207 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 1207 and/or the compiler 1210 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 1205 into gate level logic. For a DUT that is to be emulated, the design synthesizer sub-system receives a description of the DUT. If the description of the DUT is fully or partially in HDL (e.g., RTL or other levels of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

Figure 13:
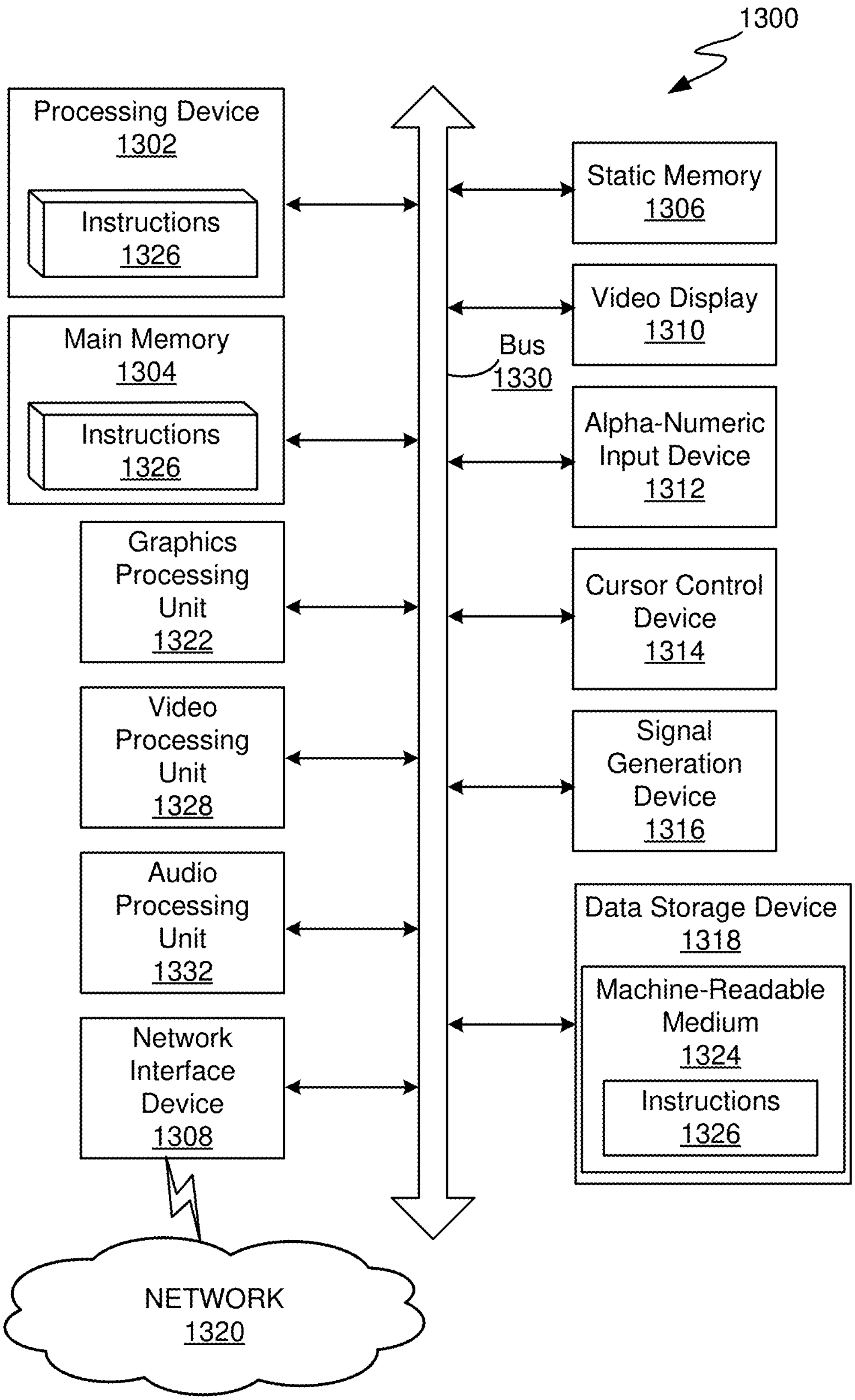
FIG. 13 depicts an example of a computer system in which embodiments of the present disclosure may operate.

FIG. 13 illustrates an example machine of a computer system 1300 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1300 includes a processing device 1302, a main memory 1304 (e.g., read-only memory (ROM), flash memory, dynamic random access memory (DRAM) such as synchronous DRAM (SDRAM), a static memory 1306 (e.g., flash memory, static random access memory (SRAM), etc.), and a data storage device 1318, which communicate with each other via a bus 1330.

Processing device 1302 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. The processing device 1302 may be configured to execute instructions 1326 for performing the operations and steps described herein.

The computer system 1300 may further include a network interface device 1308 to communicate over the network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a graphics processing unit 1322, a signal generation device 1316 (e.g., a speaker), graphics processing unit 1322, video processing unit 1328, and audio processing unit 1332.

The data storage device 1318 may include a machine-readable storage medium 1324 (also known as a non-transitory computer-readable medium) on which is stored one or more sets of instructions 1326 or software embodying any one or more of the methodologies or functions described herein. The instructions 1326 may also reside, completely or at least partially, within the main memory 1304 and/or within the processing device 1302 during execution thereof by the computer system 1300, the main memory 1304 and the processing device 1302 also constituting machine-readable storage media.

In some implementations, the instructions 1326 include instructions to implement functionality corresponding to the present disclosure. While the machine-readable storage medium 1324 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1302 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

What is claimed:

1. A method of performing hardware emulation of a circuit design, the method comprising:

receiving data from a first memory of the circuit design, wherein the first memory has a depth of D1 words each having a width of $W_1$ bits;

determining a number of segments N of each word of the first memory defined by operation floor ($W_1$/W=N), wherein W is a width of a memory primitive disposed in a hardware emulation system;

storing the N segments of each word of the first memory in first N addresses of the memory primitive; and storing a remainder R of each word of the first memory defined by ($W_1$−NW=R) in a different one of second N addresses of the memory primitive.

2. The method of claim 1 further comprising:

storing data from a second memory of the circuit design in the memory primitive.

3. The method of claim 2 further comprising:

storing the data from the second memory of the circuit design in the memory primitive if a difference between hierarchical design levels of the first and second memories in the circuit design meets a criteria.

4. The method of claim 1 further comprising:

identifying a number of ports from among M ports of the first memory that are to be accessed for write operations during a plurality of hardware emulation cycles;

receiving an M-element array of enable signal bits (En), each element of the array of enable signal bits being associated with a different one of the M ports of the first memory;

computing an M-element array of numerical values from the M-element array of enable signal bits, wherein the array of numerical values is arranged in an order;

responsive to a determination that a largest of the M numerical values is smaller than or equal to the number of ports, identifying, from the array of numerical values, positions of elements in the M-element array of enable signal bits that are in an asserted state; and accessing one or more ports of the first memory, corresponding to the identified positions of elements in the M-element array of enable signal bits, to perform a write operation.

5. The method of claim 4, wherein the M-element array of numerical values is an M-element array of prefix sums (PrefixSum) associated with the M-element array of enable signal bits, wherein the PrefixSum(k)=En(1)+En(2) . . . +En(j), wherein j is an integer variable varying from 1 to M, and wherein the identifying of the positions of the elements in the M-element array of enable signal bits that are in an asserted state comprises:

identifying, for each integer parameter U ranging from 1 to M, a leftmost bit position in the PrefixSum array for which an element in the PrefixSum array is U.

6. The method of claim 1 wherein a storage capacity of the memory primitive is greater than or equal to $D1W_1$.

7. The method of claim 1 wherein the memory primitive has a depth of D2 that is greater than D1, the method further comprising:

determining integers N1 and N2 subject to conditions (i) $N1<N2$, and (ii) $N1>(N2/2)$, such that $(D1\times N1)<=(D2-D1)\times N2$; and storing the (D2−N) remainders in V×N1addresses of the memory primitive such that $V\times N1\times W=V\times N2\times(W_1-W)$.

8. A non-transitory computer readable storage medium comprising stored instructions, which when executed by a processor, cause the processor to:

receive data from a first memory of the circuit design, wherein the first memory has a depth of D words each having a width of $W_1$ bits; and store each of N words of the first memory in a first address of a memory primitive disposed in the hardware emulation system in a single read-modify-write operation in response to a determination that a width W of a memory primitive is at least $NW_1$, wherein N is an integer equal to or greater than 2, and wherein a storage capacity of the memory primitive is greater than or equal to $DW_1$.

9. The non-transitory computer readable medium of claim 8 wherein the instructions further cause the processor to:

update a first one of the N words stored in the first address of the memory primitive using a read-modify-write operation.

10. A hardware emulation system comprising:

a memory storing instructions; and a processor, coupled with the memory and configured to execute the instructions, the instructions when executed causing the processor to emulate a circuit design, the instructions further causing the processor to:

receive data from a first memory of the circuit design, wherein the first memory has a depth of D words each having a width of $W_1$ bits;

determine a number of segments N of each word of the first memory defined by operation floor ($W_1/W=N$), wherein W is a width of a memory primitive disposed in the hardware emulation;

store the N segments of each word of the first memory in first N addresses of the memory primitive; and store K remainders R associated with K different words of the first memory and defined by ($W_1-NW=R$) in a same address of the memory primitive, wherein R is an integer greater than or equal to 2.

11. The hardware emulation system of claim 10, wherein the instructions further cause the processor to:

store data from a second memory of the circuit design in the memory primitive.

12. The hardware emulation system of claim 11, wherein the instructions further cause the processor to:

store the data from the second memory of the circuit design in the memory primitive if a difference between hierarchical design levels of the first and second memories in the circuit design meets a criteria.

13. The hardware emulation system of claim 10, wherein the instructions further cause the processor to:

identify a number of ports from among M ports of the first memory that are to be accessed for write operations during a plurality of hardware emulation cycles;

receive an M-element array of enable signal bits (En), each element of the array of enable signal bits being associated with a different one of the M ports of the first memory;

compute an M-element array of numerical values from the M-element array of enable signal bits, wherein the array of numerical values is arranged in an order;

responsive to a determination that a largest of the M numerical values is smaller than or equal to the number of ports, identify, from the array of numerical values, positions of elements in the M-element array of enable signal bits that are in an asserted state; and access one or more ports of the memory, corresponding to the identified positions of elements in the M-element array of enable signal bits, to perform a write operation.

* * * * *